United States Patent Office 3,044,317
Patented July 17, 1962

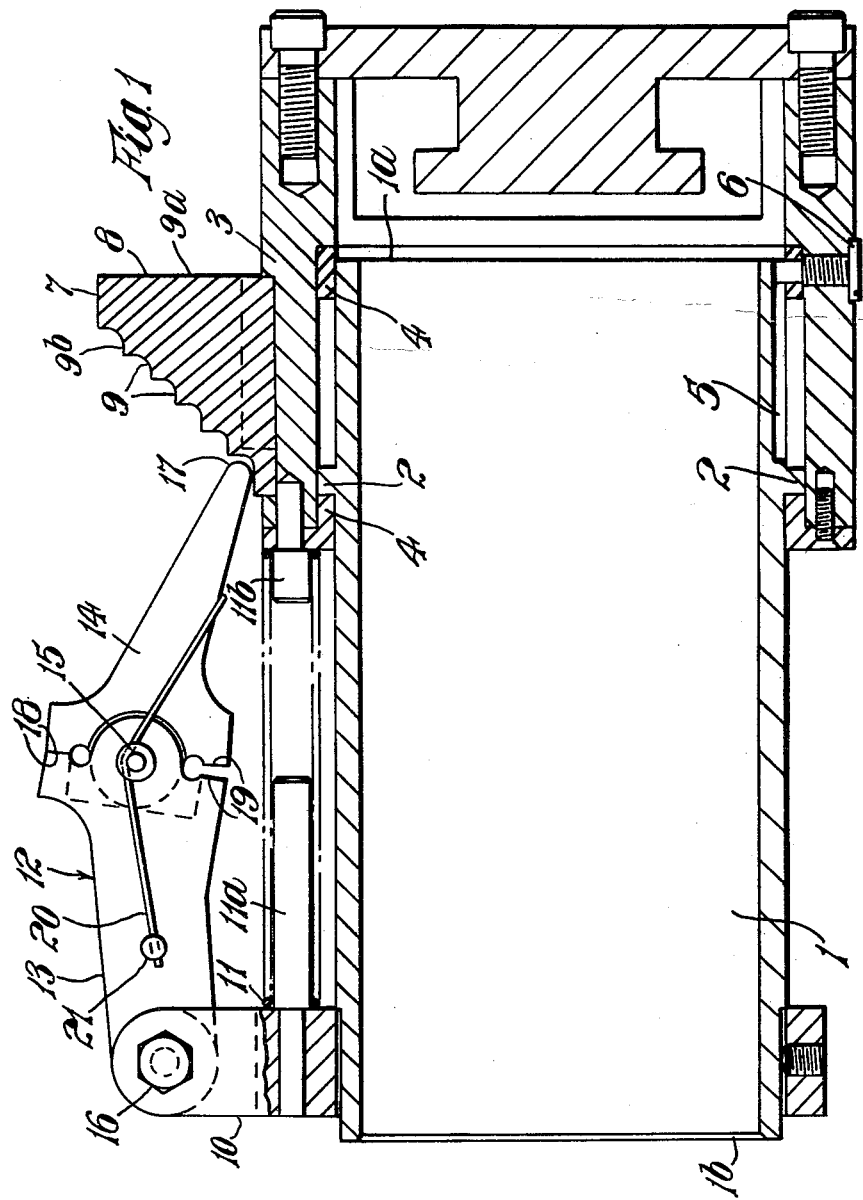

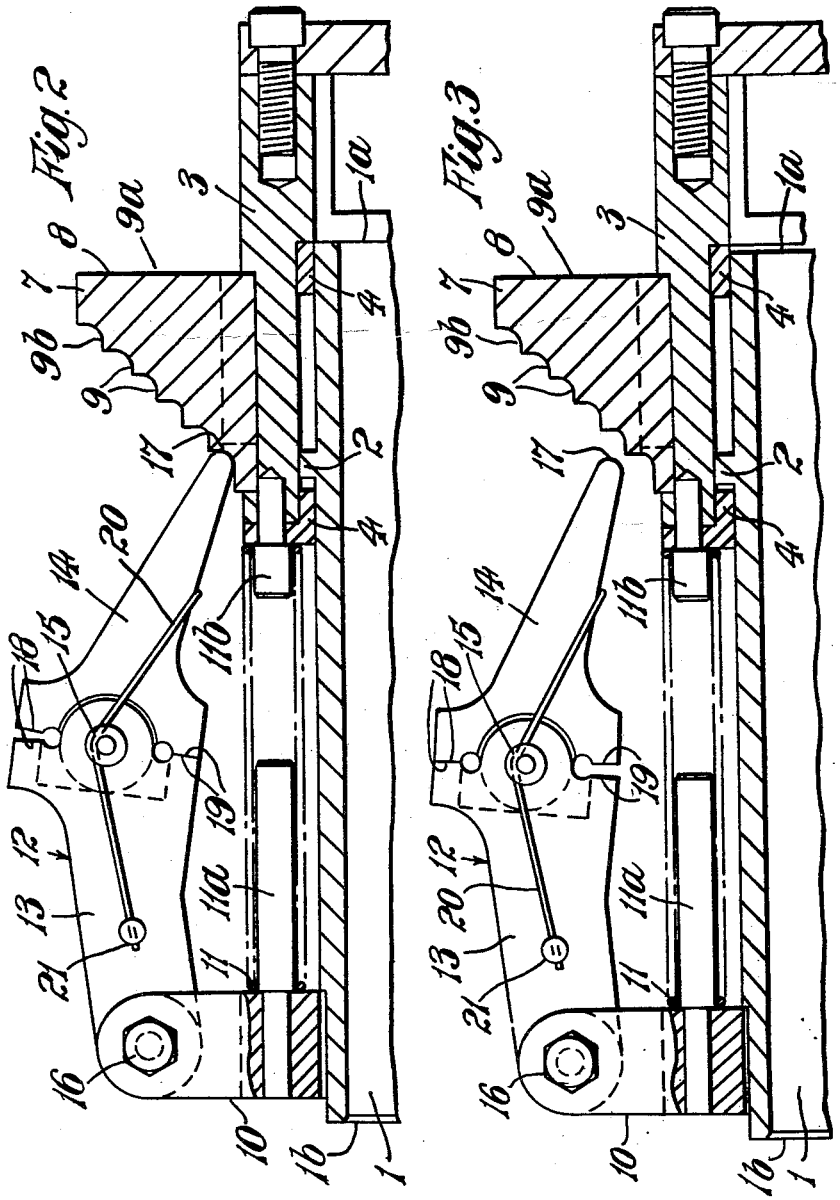

3,044,317
DEVICE FOR CONTROLLING STEP-BY-STEP RELATIVE MOVEMENT OF TWO OBJECTS
Henry William Trevaskis, Point Pleasant, Blackdown, near Leamington Spa, England, assignor, by mesne assignments, to Dunlop Tire and Rubber Corporation, Buffalo, N.Y., a corporation of New York
Filed Dec. 9, 1959, Ser. No. 858,399
Claims priority, application Great Britain Dec. 11, 1958
4 Claims. (Cl. 74—526)

This invention relates to a device for controlling step-by-step relative movement together or apart of two objects.

According to the invention a device for controlling step-by-step relative movement between two objects in a selected direction comprises a pair of relatively movable members, a fixed means supporting one of the members and a movable means supporting the other member, the movable member being mounted on the fixed means, a compound cantilever assembly of two levers pivotally connected at adjacent ends in a knuckle joint and having abutment surfaces at said joint to limit the relative tilting of said levers about said joint between a larger and a smaller angle of deflection from alignment of their longitudinal axes, a spring on said assembly biasing said levers to the smaller of said angles of deflection, the first of said levers being frictionally mounted at its end distant from said knuckle joint on one of said members, the free end of the second of said levers being directed toward the second of said members, said second member having a stop surface which extends in a general direction which is inclined to the direction of relative movement of said members and positioned to engage and hold the free end of said second lever in fixed position thereon upon relative movement in the selected direction of said members thereby to tilt said levers toward the larger angle from alignment and upon reverse movement to release said second lever to assume its smaller angle from alignment by the action of said spring.

For the levers to tilt as described it is necessary that the point of engagement of the end of the compound cantilever assembly with the inclined stop surface should be out of line with the frictional mounting and the knuckle joint when the levers are relatively tilted to the smaller angle of deflection. It has been found that a convenient angle between the line through the frictional mounting and the knuckle joint and the line through the knuckle joint and the point of engagement with the inclined surface, when the levers are relatively tilted to the smaller angle of deflection as limited by the stop means, is about 150 degrees but any angle less than 180 degrees should be satisfactory.

The invention includes not only a device for controlling relative movement together between two objects but also includes a device for controlling relative movement of two objects apart. Furthermore, the movement together or apart is applicable to objects which are relatively movable in the rotary sense, e.g. objects attached one to each of two coaxial relatively movable shafts.

Means for preventing slipping of the end of the compound cantilever assembly when it engages the inclined surface may simply be a roughening of the surface or some other means to provide a high coefficient of friction. Preferably, however, the surface is provided with a series of steps which can be engaged by the end of the compound cantilever assembly.

One embodiment of the invention will now be described, by way of example, with reference to the accompanying drawings in which:

FIGURE 1 is a longitudinal section through a device according to the invention in its starting position.

FIGURES 2 and 3 are similar sections to FIGURE 1, FIGURE 2 showing the parts moved slightly towards each other and FIGURE 3 the parts set in their new starting position.

A device according to the invention comprises a tubular shaft 1 of internal diameter such as to slidably fit on an axial shaft on which a tire building former (not shown) is mounted. Towards the end 1a of the shaft 1 and formed integrally with it, is a short radially outwardly extending flange 2. A sleeve 3 with an internal diameter slightly greater than the outer diameter of the flange 2 and fitted internally with spaced apart bushings 4 is slidably mounted on the shaft 1. It is positioned with the flange lying intermediate the bushings which are unable to pass over the flange so that the sleeve is anchored to the shaft, and movement of the sleeve being limited by the bushings. To prevent the sleeve 3 rotating around the shaft 1, a keyway 5, as shown in FIGURE 1, is cut in the outer surface of the shaft 1, longitudinally from the flange 2 to the end 1a of the shaft. A location bolt 6 projects radially inwardly from the sleeve 3 into the keyway 5.

Three blocks 7 are equally spaced around the periphery of, and secured to, the shaft 3. Each of the blocks has a flat radial surface 8 on its side 9a towards the end 1a of the shaft 1. The opposite side 9b of the block is a stop surface inclined at an angle of approximately 45 degrees, and it is formed with a series of equal steps 9 increasing progressively in diameter.

Three pairs of radially outwardly extending mounting lugs 10 are secured to the end 1b of the shaft 1, one pair for each of the blocks 7. Each pair of lugs 10 is longitudinally in line with a block 7. A compression spring 11 is fitted between each block and its associated lug to urge them apart the spring being located in position by the pins 11a and 11b attached to the block and lug.

Each pair of lugs 10 has a compound cantilever assembly 12 connected to it which comprises two levers 13 and 14 pivotally connected together by a pin 15 passing through one end of each so as to form a freely rotatable knuckle joint. The other end of the lever 13 is pivotally connected to the pair of lugs 10 by a lug-clamping bolt 16 and the lever extends towards an associated block 7 at the other end of the shaft. The other end of the lever 14 remote from the lug is formed into a rounded nose 17 for engaging the steps of the block. The pivotal connection of the lever 13 with the lug 10 includes friction washers one on each side of the link, between the mounting lugs, so as to hold the lever in any angular position relative to the lugs, the lug clamping bolt being tightened to give the required degree of friction between the washers and lever 13. The relative pivotal movement of the levers 13 and 14 is limited between a larger and a smaller angle of deflection from alignment of the longitudinal axes of the levers. Abutment surfaces 18, one on each lever, contact each other when the levers are moved to the smaller angle of deflection and abutment surfaces 19, one on each lever, contact each other when the levers are moved to the larger angle of deflection. A mouse-trap type of spring 20 is carried on the pin 15. It is secured at one end to a pin 21 passing through the levers 13, and is looped underneath and contacts the radially innermost surface of the lever 14 so as to urge the levers towards the smaller angle of deflection.

The use of the device will be described in conjunction with a ply turndown device as described in our co-pending patent application U.S. Serial No. 788,574, filed January 23, 1959. In this application there is described a former, a coaxially mounted subsidiary former and a contractible circular rubber ring for turning down tire plies mounted on the former. The subsidiary former is moved axially, step-by-step, towards the former to allow the contractible rubber ring to turn-down the tire plies. The device of the present application is interposed between the former and the subsidiary former to permit the step-by-step movement. The device of the present application is slipped onto the shaft of a building former (not shown) with the lugs 10 near to the former. The ply turn-down device is mounted on the sleeve 3 so as to abut the surfaces 8 of the blocks 7. With the device in the extended state shown in FIGURE 1, the operating end of the turn down device is slightly clear of the plies mounted on the former. The turn down device is pressed axially inwardly towards the former. This causes the sleeve 3 to slide relative to the shaft 1, and the noses 17 of the compound cantilever assemblies 12 engage the radially innermost steps of the blocks 7, as shown in FIGURE 1. On further axially inward movement of the turn down device the levers 13 and 14 are flexed into the larger angle of deflection with its abutment surfaces 19 in contact thus halting the inward movement of the turn down device. During this flexing movement each lever 13 is pivoted slightly radially outwardly about the pin 16 and the lever 14 is rotated slightly on its nose 17 in engagement with the innermost step (compare FIGURES 1 and 2). Each lever 13 at pin 16, is in contact with friction washers and the lever 13 is held stationary at the position to which it has swung. Movement of the turn down device is then reversed and the sleeve 3 is urged away from the blocks 10 by the spring 11, thus disengaging the nose 17 of the lever 14 with the first step in the block 7. When the nose 17 of each compound cantilever assembly is thus freed, the spring 20 urges the lever 14 outwardly to return the levers to the smaller of the angles of deflection. In this position of the levers the nose 17 of each assembly 12 lies at a greater radial distance from the shaft 1 than before. The degree of movement permitted by the abutment surfaces 18 and 19, and the radial height of the steps 9 is such that in this position the noses 17 are aligned with the second step of the blocks 7. The turn down device is then again moved axially inwardly towards the former and a degree of movement is permitted until the noses 17 engage the second step and the levers 13 and 14 flex as before until the movement is halted by the abutment surfaces 19.

This intermittent movement of the turndown device or object is repeated, the levers 14 springing outwardly at each step so as to permit a greater degree of inward movement.

Having now described my invention, what I claim is:

1. A device for controlling step-by-step relative movement between two objects in a selected direction which comprises a pair of relatively movable members, a fixed means supporting one of the members and a movable means supporting the other member, the movable member being mounted on the fixed means a compound cantilever assembly of two levers pivotally connected at adjacent ends in a knuckle joint and having abutment surfaces at said joint to limit the relative tilting of said levers about said joint between a larger and a smaller angle of deflection from alignment of their longitudinal axes, a spring on said assembly biasing said levers to the smaller of said angles of deflection, the first of said levers being frictionally mounted at its end distant from said knuckle joint on one of said members, the free end of the second of said levers being directed toward the second of said members, said second member having a stop surface which extends in a general direction which is inclined to the direction of relative movement of said members and positioned to engage and hold the free end of said second lever in fixed position thereon upon relative movement in the selected direction of said members thereby to tilt said levers toward the larger angle from alignment and rotate said first of said levers on its support and upon reverse movement to release said second lever to assume its smaller angle from alignment by the action of said spring.

2. A limiting device according to claim 1 wherein the member having an inclined surface is provided on its inclined surface with a plurality of steps each provided with a face transverse to the direction of relative movement of said members and a face longitudinal to said direction of movement.

3. A limiting device according to claim 1 wherein the fixed means is a shaft on which one of said members is mounted in fixed position and the movable means is a sleeve slidably mounted on said shaft and carrying the other member.

4. A limiting device according to claim 1 having a compression spring disposed between said members to move said members from each other.

References Cited in the file of this patent
UNITED STATES PATENTS

| | | |
|---|---|---|
| 1,101,263 | Eggart | June 23, 1914 |
| 2,001,572 | Haren et al. | May 14, 1935 |
| 2,123,978 | Wagner | July 19, 1938 |
| 2,230,527 | Crawford et al. | Feb. 4, 1941 |
| 2,819,360 | Martin | Jan. 7, 1958 |
| 2,892,351 | McCarty | June 30, 1959 |